United States Patent [19]
Diehl et al.

[11] Patent Number: 5,657,787
[45] Date of Patent: Aug. 19, 1997

[54] GAS PRESSURE REDUCING REGULATOR

[75] Inventors: Gregory W. Diehl, Florence; Samuel R. Averette, Murrells Inlet, both of S.C.

[73] Assignee: The ESAB Group, Inc., Florence, S.C.

[21] Appl. No.: 584,388

[22] Filed: Jan. 11, 1996

[51] Int. Cl.⁶ .................................................. G05D 11/00
[52] U.S. Cl. ........................... 137/116.5; 137/505.14; 137/505.12; 251/284
[58] Field of Search ................. 137/505.14, 116.3, 137/505.42, 116.5; 251/284

[56] References Cited

U.S. PATENT DOCUMENTS

| | | |
|---|---|---|
| 225,898 | 3/1880 | Westinghouse, Jr. . |
| 406,029 | 7/1889 | Curtis . |
| 573,462 | 12/1896 | Hawley . |
| 1,145,601 | 7/1915 | Lemoine ............................ 137/116.3 |
| 1,832,863 | 11/1931 | Hewitt . |
| 1,897,432 | 2/1933 | Klotzman . |
| 2,331,084 | 10/1943 | Sortensen . |
| 2,645,884 | 7/1953 | Kellie . |
| 2,761,389 | 9/1956 | Turner . |
| 2,768,643 | 10/1956 | Acomb . |
| 3,103,230 | 9/1963 | Kutsche ............................ 137/116.3 |
| 3,113,432 | 12/1963 | Watson . |
| 3,255,775 | 10/1962 | Albro ................................... 251/284 |
| 3,348,573 | 10/1967 | Bradford . |
| 3,911,947 | 10/1975 | Boxall ............................... 137/505.14 |
| 3,926,208 | 12/1975 | Hoffman et al. . |
| 4,624,277 | 11/1986 | Velte ................................. 137/116.3 |
| 5,022,435 | 6/1991 | Jaw-Shiunn . |
| 5,072,749 | 12/1991 | Ligh ................................. 137/505.14 |
| 5,139,046 | 8/1992 | Galli . |
| 5,234,026 | 8/1993 | Patterson . |
| 5,452,741 | 9/1995 | Tomita ............................... 137/116.5 |

*Primary Examiner*—Denise L. Ferensic
*Assistant Examiner*—Ramyar M. Farid
*Attorney, Agent, or Firm*—Bell, Seltzer, Park & Gibson

[57] ABSTRACT

A gas pressure regulator comprising a body member which mounts a valve between the inlet and outlet gas passages, and which also includes a tubular sleeve which communicates with the outlet passage. A pressure adjusting cap is threadedly mounted to the tubular sleeve. A slidable piston is housed within the tubular sleeve and serves to adjust the opening of the valve, and the movement of the piston is guided by a bore in the cap, so as to preclude tilting or jamming of the piston. The cap also includes an outer sleeve which is coaxially outside the tubular sleeve of the body member, so as to facilitate manual rotation of the cap to adjust the valve opening.

9 Claims, 2 Drawing Sheets

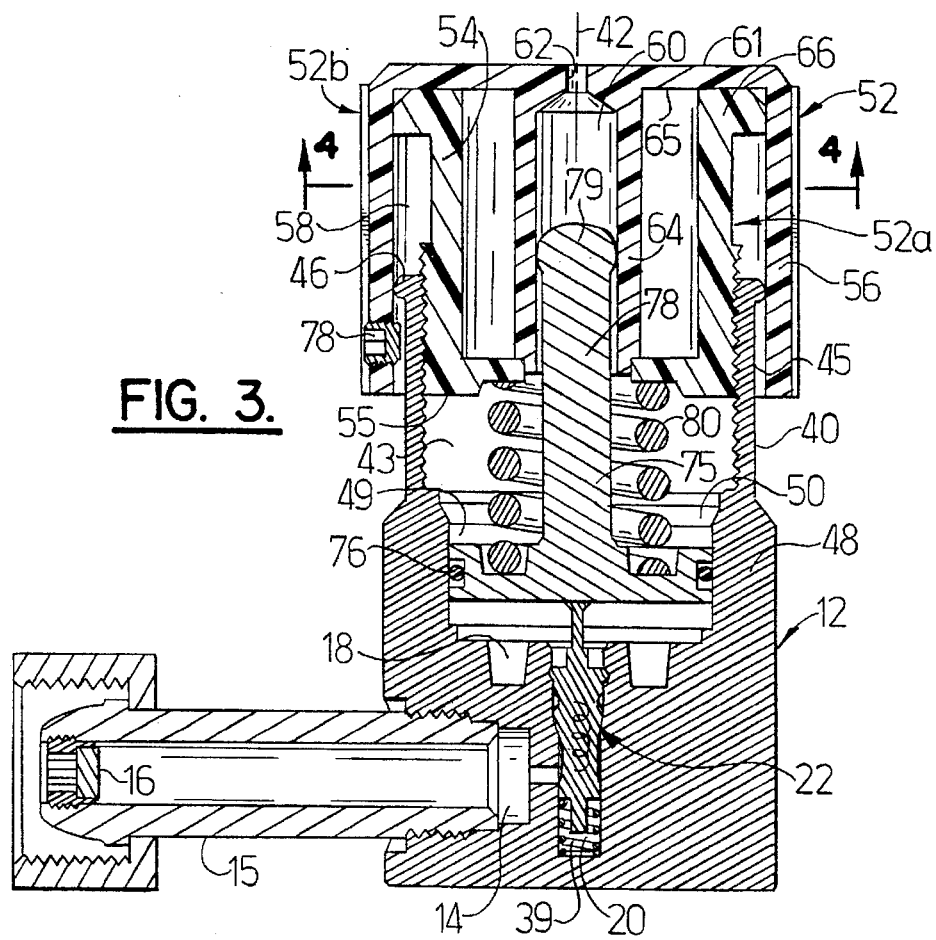
FIG. 3.
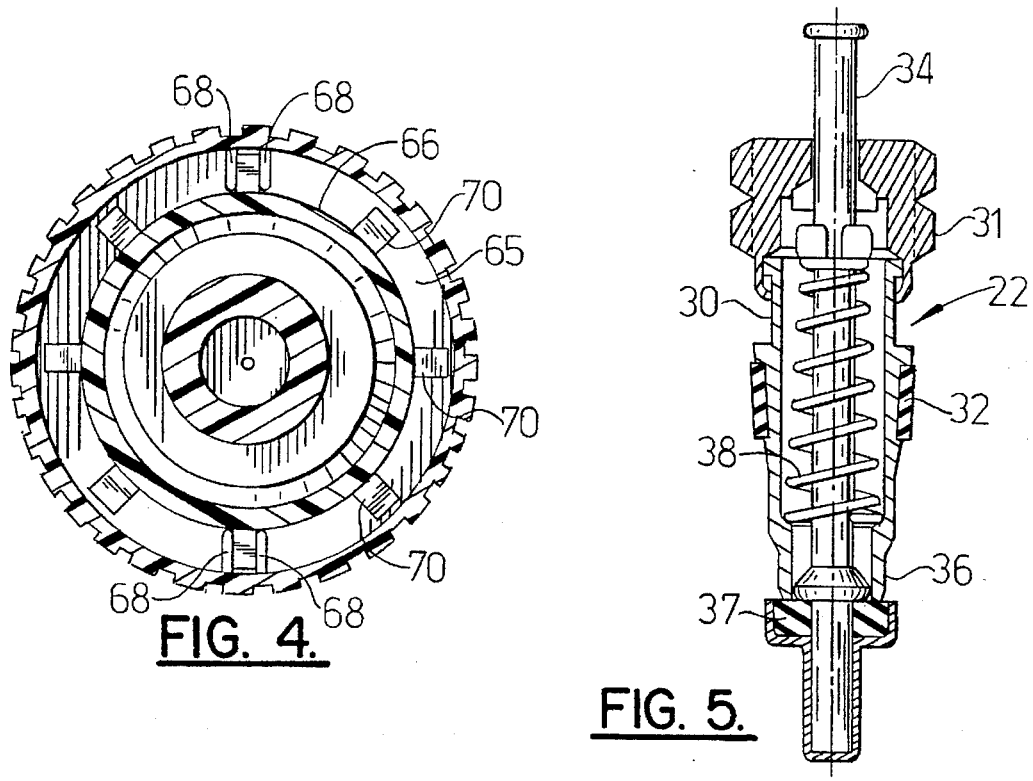
FIG. 4.
FIG. 5.

GAS PRESSURE REDUCING REGULATOR

BACKGROUND OF THE INVENTION

The present invention relates to a compressed gas regulator of the type which may be attached to a compressed gas cylinder so as to regulate the flow of the gas therefrom.

A regulator of the described type is disclosed in U.S. Pat. No. 2,768,643, and which comprises a casing which mounts a valve positioned between inlet and outlet gas passages, and a diaphragm clamped within the casing so as to be moveable to adjust the size of the opening of the valve. The movement of the diaphragm, and thus the pressure of the gas being discharged, are controlled by a manually adjustable screw, which controls the loading of a spring which engages the diaphragm.

It is an object of the present invention to provide an improved gas regulator of the described type, which is of compact and durable design, and which utilizes a minimum number of parts.

It is a more particular object of the present invention to provide an improved gas regulator which utilizes a piston as the valve engaging element as opposed to a diaphragm, and which includes provision for accurately guiding the movement of the piston toward and away from the valve.

It is also an object of the present invention to provide a gas regulator which utilizes a pressure adjusting cap which functions both to guide the axial movement of the piston and to permit adjustment of the pressure of the gas being discharged.

SUMMARY OF THE INVENTION

The above and other objects and advantages of the present invention are achieved by the provision of a gas regulator which comprises a body member which includes an inlet passage, an outlet passage, and a tubular sleeve which communicates with said outlet passage. The tubular sleeve defines a central axis and includes an outer portion which is internally threaded and an inner portion which defines an internal cylindrical wall surface. A valve is positioned in the body member between the inlet passage and the outlet passage, so as to permit controlled gas flow therebetween, and valve includes a fixed valve seat, and a valve pin which is slidable along the central axis between an open position separated from the valve seat and a closed position closing the valve seat. A valve closing spring is provided for biasing the valve pin toward the closed position.

A pressure adjusting cap is also provided which comprises an externally threaded cylindrical core which is threadedly mounted in the outer portion of the tubular sleeve of said body member and which defines a transverse front end face. The cap further comprises an outer sleeve which coaxially surrounds the core in a spaced apart relation so as to define an annular cavity therebetween so that a portion of the tubular sleeve of the body member is received in the annular cavity. Also, the core includes a central bore which is coaxially aligned with the central axis and communicates with the front end face, and a piston is coaxially mounted within the tubular sleeve so as to slideably and sealably engage the internal cylindrical wall surface of the tubular sleeve. The piston includes a stem which extends along the central axis and into the central bore of the cap, with the stem being sized so as to be closely but slideably received in the central bore to thereby guide the axial movement of the piston. A biasing spring extends between the transverse front end face of the core of the cap and the piston, and so as to bias the piston axially toward and into contact with the valve pin and thereby bias the valve pin toward said open position. By this arrangement, the cap may be easily rotated by manually gripping the outer sleeve of the cap and such that rotation of said cap serves to adjust the force of the piston acting on the valve pin and thus the extent to which the valve is opened.

In the preferred embodiment, the regulator further comprises interengaging means mounted on the outer sleeve of the cap and on the outer portion of the tubular sleeve of the body member, for precluding the cap from being totally unthreaded from the body member.

BRIEF DESCRIPTION OF THE DRAWINGS

Some of the objects and advantages of the present invention having been stated, others will appear as the description proceeds, when taken in conjunction with the accompanying drawings, in which:

FIG. 3 is a cross-sectional view of the regulator shown in FIG. 1;

FIG. 4 is a cross sectional view of the cap of the regulator, taken substantially along the line 4—4 of FIG. 3; and FIG. 5 is an enlarged sectional view of the valve utilized in the preferred embodiment of the regulator.

DETAILED DESCRIPTION OF THE PREFERRED EMBODIMENT

Figure 1:
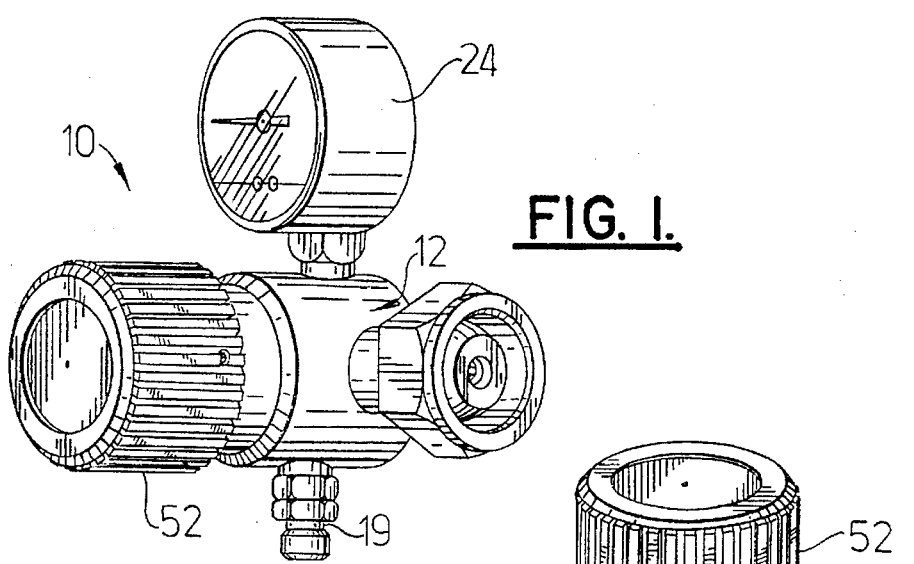
FIG. 1 is a perspective view of a gas pressure reducing regulator embodying the present invention.
Figure 2:
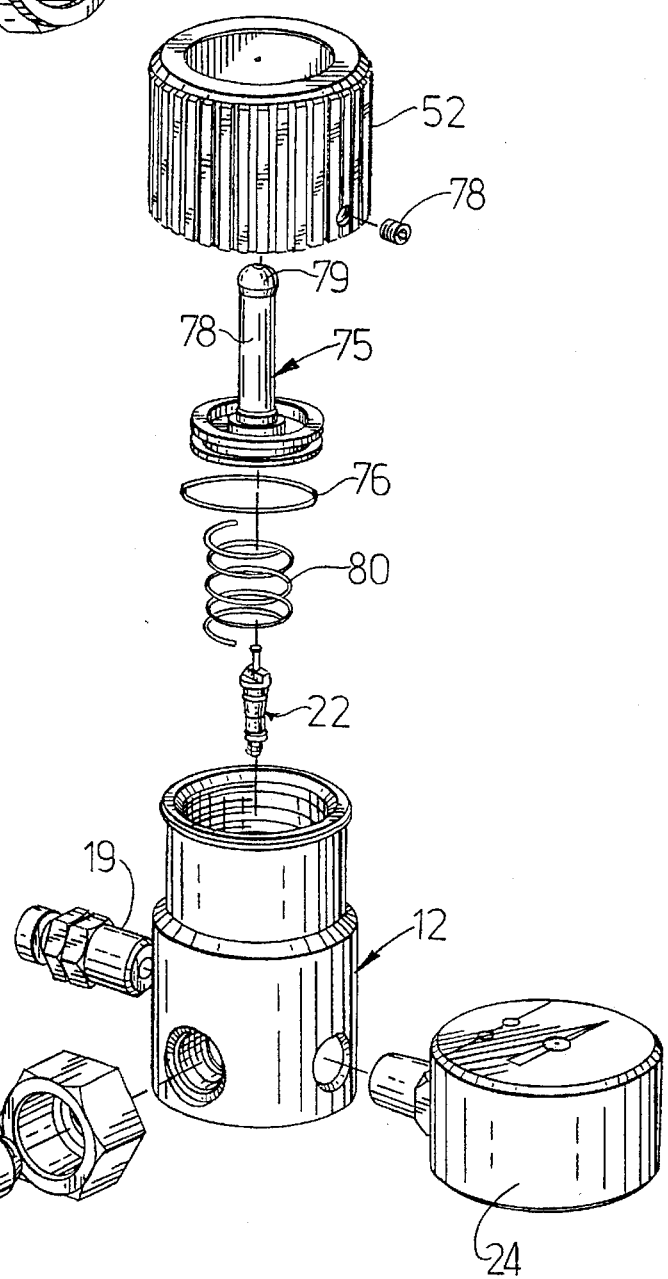
FIG. 2 is an exploded perspective view of the regulator shown in FIG. 1.

Referring more particularly to the drawings, FIG. 1 illustrates a gas regulator at 10, which embodies the features of the present invention, and which may be attached to a conventional pressurized gas cylinder (not shown) so as to reduce and regulate the gas delivered therefrom. The regulator 10 comprises a body member 12 which includes an inlet passage 14 which mounts an inlet connector tube 15 which is adapted for connection to the gas cylinder, and which may include an inlet filter 16 of conventional design. The body member 12 also includes an outlet passage 18 which communicates with the outlet connector tube 19, and an internal passage 20 which extends between the inlet passage 14 and the outlet passage 18. The internal passage 20 mounts a valve 22, so as to permit a controlled gas flow through the regulator. Also, a gauge 24 is mounted to the body member 12 so as to register the pressure in the inlet passage, it being understood that the gauge 24 may be connected to the outlet passage 18 for indicating the delivery pressure, if desired. In addition, two gauges may, if desired, be provided for indicating both the inlet and delivery pressures, respectively.

As best seen in FIG. 5, the valve 22 includes a tubular barrel 30 which has a cap 31 fixed to one end and which is threadedly mounted in the internal passage 20. A plastic gasket 32 is interposed between the barrel and the wall of the passage 20 so as to form an air tight seal therebetween, and a valve pin 34 extends coaxially through the barrel 30 and the end cap 31 so as to be exposed in the portion of the outlet passage 18 above the internal passage 20. The lower end of the barrel 30 forms a valve seat 36, and the lower end of the pin 34 mounts a cup shaped housing which carries a rubber-like gasket 37 for engaging and closing the valve seat 36 when the pin 34 is biased upwardly by an internal spring 38, which is mounted in the barrel 30. A second spring 39 may if desired be positioned between the housing for the gasket 37 and the bottom of the passage 20, to increase the upward biasing force. The biasing force of the springs 38 and 39 thus serve to move the pin 34 upwardly and close the valve seat 36. When the pin 34 is biased downwardly against the force of the springs 38 and 39, the valve seat 36 is thereby opened to an extent controlled by the magnitude of the downward force.

The body member 12 of the regulator 10 further comprises a tubular sleeve 40 which is disposed coaxially with the axis of the internal passage 20. The tubular sleeve 40 thus defines a central axis 42 of the body member, as well as an internal chamber 43, which communicates with the outlet passage 18. The tubular sleeve 40 includes an outer portion 45 which is internally threaded and which also includes an annular lip 46 which extends radially outwardly therefrom, for the purposes described below. The tubular sleeve 40 also includes an inner portion 48 which defines an internal cylindrical wall surface 49 as well as a tapered annular wall surface 50 which is positioned between the internal threads and the internal cylindrical wall surface 49.

A pressure adjusting cap 52 is threadedly mounted to the tubular sleeve 40 of the body member, and the cap 52 comprises an externally threaded cylindrical core 54 which is threadedly mounted in the outer portion 45 of the tubular sleeve 40 of the body member. The core 54 also defines a transverse front end face 55 of the cap, and the cap further comprises an outer sleeve 56 which coaxially surrounds the core 54 in a spaced apart relation so as to define an annular cavity 58 therebetween. When assembled to the tubular sleeve 40, a portion of the tubular sleeve 40 is thus received in the annular cavity 58. The core 54 of the adjusting cap also includes a central bore 60 which is coaxially aligned with the central axis 42 and which communicates with the front end face 55.

The cap 52 also defines a transverse outer face 61 which is opposite the transverse front end face 55 of the core, and the central bore 60 includes a relief opening 62 which communicates with the outer face 61 so as to provide a vent for the central bore 60 to the atmosphere. The relief opening 62 is of a diameter significantly smaller than that of the central bore 60, so as to preclude the entry of debris into the central bore.

As best seen in FIGS. 4–5, the cap 52 may be formed of two separately molded plastic components, with the first component 52a comprising the core 54, and the second component 52b forming the outer face 61 the outer sleeve 56, and an inner sleeve 64 which defines the bore 60. Further, it will be seen that the first component 52a defines an annular sleeve 66 which is disposed between the outer sleeve 56 and the inner sleeve 64 of the second component, and the second component 52b defines an inner end wall 65 positioned between the outer sleeve 56 and the inner sleeve 64 thereof. The two-components 52a, 52b may be secured together by a suitable adhesive or by a sonic welding procedure.

As illustrated in FIG. 4, the inner end wall 65 of the second component 52b includes two pairs of spaced apart integral detents 68 and the adjacent annular sleeve 66 of the second component 52b includes a plurality of radially extending lugs 70. The lugs 70 are sized and positioned so that two of the lugs 70 are received within respective ones of the two pairs of detents 68, so as to firmly secure the two components against relative rotational movement.

A piston 75 is coaxially mounted within the tubular sleeve 40 so as to slideably and sealably engage the internal cylindrical wall surface 49 of the tubular sleeve, and to apply a controlled biasing force to the valve pin 34 against the force of the spring 38. For this purpose, the outer periphery of the piston mounts an annular sealing ring 76 for providing the desired seal between the periphery of the piston and the wall surface 49. Also, the piston 75 includes a stem 78 which extends along the central axis 42 and into the central bore 60 of the cap 52. The stem 78 includes a head 79 at its upper end which is sized so as to be closely but slideably received in the central bore 60 and so as to be adapted to guide the axial movement of the piston 75. By this arrangement, tilting or canting of the piston 75 is avoided as it moves axially toward and away from the valve 22, which could otherwise lead to air leakage between the periphery of the piston and the wall surface 49 as well as the scoring of the wall surface. A tilted piston could also become jammed in the chamber, holding the valve open and resulting in a dangerously high pressure in the outlet or low pressure side of the valve.

A helical spring 80 is positioned to encircle the stem 78 of the piston 75 and extend between the transverse front end face 55 of the core 54 of the cap, and the piston 75, so as to axially bias the piston 75 into contact with the valve pin 34, thereby tending to open the valve 22 against the force of the spring 38. As will be apparent, the extent of the force applied by the helical spring 80, and thus the degree to which the valve 22 is opened, is controlled by the rotational position of the cap 52, i.e., the extent to which the cap is threaded into the tubular sleeve 40.

A set screw 82 is mounted on the outer sleeve 56 of the cap so as to extend radially into the annular cavity 58, and so as to engage the annular lip 46 upon the cap being unthreaded from the body member to a predetermined extent. Thus, the cap 52 is precluded from being totally unthreaded from the body member.

The tapered annular wall surface 50 of the tubular sleeve 40 functions to permit excess pressure in the outlet passage 18 to escape to the atmosphere. More particularly, the excess pressure will force the piston 75 upwardly against the force of the spring 80, until the O-ring 66 no longer contacts the wall 49. At this point, the tapered wall surface 50 is exposed to the outlet passage 18 and the outlet passage is vented around the periphery of the piston.

In the drawings and the specification, there has been set forth preferred embodiments of the invention, and, although specific terms are employed, the terms are used in a generic and descriptive sense only and not for the purpose of limitation, the scope of the invention being set forth in the following claims.

That which is claimed is:

1. A gas pressure regulator comprising:

a body member which includes an inlet passage, an outlet passage, and a tubular sleeve which communicates with said outlet passage, and with said tubular sleeve defining a central axis and including an outer portion which is internally threaded and an inner portion which defines an internal cylindrical wall surface, a valve positioned in said body member between said inlet passage and said outlet passage so as to permit controlled gas flow therebetween, said valve including a fixed valve seat, a valve pin which is slidable along said central axis between an open position separated from the valve seat and a closed position closing the valve seat, and a valve closing spring for biasing said valve pin toward said closed position, a pressure adjusting cap comprising an externally threaded cylindrical core which is threadedly mounted in said outer portion of said tubular sleeve of said body member and which defines a transverse front end face, said cap further comprising an outer sleeve which coaxially surrounds said core in a spaced apart relation so as to define an annular cavity therebetween so that a portion of said tubular sleeve of said body member is received in said annular cavity, and wherein said cap further comprises a central bore which is coaxially aligned with said central axis and communicates with said front end face, a piston coaxially mounted within said tubular sleeve so as to slideably and sealably engage the internal cylindrical wall surface of the tubular sleeve, said piston including a stem which extends along said central axis and into said central bore of said cap, with said stem being sized so as to be closely but slideably received in said central bore to thereby guide the axial movement of the piston, means for venting the central bore to the atmosphere, spring biasing means extending between said transverse front end face of said core of said cap and said piston, and so as to bias said piston axially toward and into contact with said valve pin and thereby bias the valve pin against the force of said valve closing spring and toward said open position, and such that the cap may be easily rotated by manually gripping the outer sleeve of the cap and wherein rotation of said cap serves to adjust the force of the piston acting on said valve pin and thus the extent to which the valve is opened; and interengaging means mounted on said outer sleeve of said cap and on said outer portion of said tubular sleeve of said body member, for precluding the cap from being totally unthreaded from said body member.

2. The regulator as defined in claim 1 wherein said interengaging means comprises an annular lip formed on the outer portion of the tubular sleeve of said body member and extending radially outwardly therefrom, and a set screw mounted on said outer sleeve of said cap and extending radially into said annular cavity and so as to engage said annular lip upon the cap being unthreaded from said body member to a predetermined extent.

3. The regulator as defined in claim 1 wherein said cap defines on outer face opposite said transverse front end face, and wherein said venting means including a relief opening which communicates with said outer face so as to vent the central bore to the atmosphere, said relief opening being of a diameter smaller than that of said central bore so as to preclude the entry of debris into the central bore.

4. The regulator as defined in claim 1 wherein a tapered annular wall surface is formed between said internal threads and said internal cylindrical wall surface of said tubular sleeve of said body member, with the tapered annular wall surface increasing in diameter in a direction from said tapered annular wall surface toward said internal threads, and such that an excessive pressure in said outlet passage will cause the piston to move axially away from said valve and against the force of said spring biasing means to a position wherein said tapered annular wall surface is exposed to the outlet passage and such that the outlet passage is vented around the piston.

5. The regulator as defined in claim 1 wherein said core of said cap comprises a first molded plastic component, and said outer sleeve of said cap comprises a second molded plastic component which is joined to said first component to form a unitary structure.

6. The regulator as defined in claim 5 wherein said cap further comprises an inner sleeve which defines said central bore, and wherein said inner sleeve is part of said second molded plastic component.

7. A gas pressure regulator comprising:

a body member which includes an inlet passage, an outlet passage, and a tubular sleeve which communicates with said outlet passage, and with said tubular sleeve defining a central axis and including an outer portion and an inner portion which defines an internal cylindrical wall surface, a valve positioned in said body member between said inlet passage and said outlet passage so as to permit controlled gas flow therebetween, said valve including a fixed valve seat, a valve pin which is slidable along said central axis between an open position separated from the valve seat and a closed position closing the valve seat, and a valve closing spring for biasing said valve pin toward said closed position, a pressure adjusting cap including an inner sleeve which defines a central bore which is coaxially aligned with said central axis, a tubular core which coaxially surrounds said inner sleeve, an outer sleeve which coaxially surrounds said core in a spaced apart relation so as to define an annular cavity therebetween and with a portion of said tubular sleeve of said body member being received in said annular cavity, and a transverse front end face which faces inwardly toward said inner portion of said tubular sleeve, said cap further including threads in said annular cavity which are concentric with said central axis, and said portion of said body member which is received in said annular cavity including threads which are engaged with the threads of said cap, such that rotation of said cap causes said cap to move axially with respect to said body member, a piston coaxially mounted within said tubular sleeve so as to slideably and sealably engage the internal cylindrical wall surface of the tubular sleeve, said piston including a stem which extends along said central axis and into said central bore of said inner sleeve of said cap, with said stem being sized so as to be closely but slideably received in said central bore to thereby guide the axial movement of the piston, means for venting the central bore to the atmosphere, a helical spring extending between said transverse front end face of said cap and said piston, and so as to bias said piston axially toward and into contact with said valve pin and thereby bias the valve pin against the force of said valve closing spring and toward said open position, and such that the cap may be easily rotated by manually gripping the outer sleeve of the cap and wherein rotation of said cap serves to adjust the force of the piston acting on said valve pin and thus the extent to which the valve is opened; and interengaging means mounted on said outer sleeve of said cap and on said outer portion of said tubular sleeve of said body member, for precluding the cap from being totally unthreaded from said body member.

8. The regulator as defined in claim 7 wherein said tubular core and said transverse front end face comprise a monolithic first component of said cap, wherein said inner sleeve and said outer sleeve comprise a monolithic second component of said cap, and wherein said first and second components are joined to each other to form a unitary structure.

9. The regulator as defined in claim 8 wherein said first and second components of said cap are each molded plastic.

* * * * *